United States Patent [19]

Suzuki et al.

[11] Patent Number: 4,961,653
[45] Date of Patent: Oct. 9, 1990

[54] CROSSED ROLLER BEARING ASSEMBLY HAVING AN INSERTION HOLE

[75] Inventors: Osamu Suzuki, Yokohama; Ichiro Masuda, Hyogo, both of Japan

[73] Assignee: Nippon Thompson Co., Ltd., Tokyo, Japan

[21] Appl. No.: 329,928

[22] Filed: Mar. 29, 1989

[30] Foreign Application Priority Data

Mar. 29, 1988 [JP] Japan .................. 63-73437

[51] Int. Cl.$^5$ .............................................. F16C 19/30
[52] U.S. Cl. .................................. 384/447; 384/619;
384/622
[58] Field of Search ............. 384/447, 507, 508, 510,
384/511, 559, 560, 584, 617–622

[56] References Cited

U.S. PATENT DOCUMENTS

| | | | |
|---|---|---|---|
| 3,275,391 | 9/1966 | Blais | 384/447 |
| 3,361,501 | 1/1968 | Messinger et al. | 384/620 |
| 3,814,488 | 6/1974 | Rood | 384/619 X |
| 4,606,654 | 8/1986 | Yatsu et al. | 384/619 X |

Primary Examiner—Thomas R. Hannon
Attorney, Agent, or Firm—Skjerven, Morrill MacPherson, Franklin & Friel

[57] ABSTRACT

A crossed roller bearing assembly includes an outer ring provided with an outer V-shaped guide groove, an inner ring provided with an inner V-shaped guide groove and a plurality of rollers arranged in a guide space defined between the outer and inner V-shaped guide grooves in a rolling contact fashion. An insertion hole is formed in one of the outer and inner rings and the insertion hole preferably has a diameter which is larger than the diameter of the rollers, but smaller than a diagonal length in cross section of the rollers. A plug having a shape which substantially corresponds to the shape of the insertion hole is fitted into the insertion hole after insertion of the rollers. No gap or clearance is defined between the insertion hole and the plug so that the rollers can roll along the guide space smoothly.

4 Claims, 4 Drawing Sheets

CROSSED ROLLER BEARING ASSEMBLY HAVING AN INSERTION HOLE

BACKGROUND OF THE INVENTION

1. Field of the Invention

This invention generally relates to a bearing assembly and in particular to a crossed roller bearing assembly including a plurality of rollers arranged alternately in a crossed relationship.

2. Description of the Prior Art

A typical crossed roller bearing assembly is disclosed in the U.S. Pat. No. 3,275,391. An improved crossed roller bearing assembly is disclosed in the U.S. Pat. No. 4,606,654, which is assigned to the assignee of this application and which is hereby incorporated by reference. In the structure disclosed in this U.S. Pat. No. 4,606,654, an insertion hole for inserting a plurality of rollers into a space between a pair of inner and outer rings is provided in the outer ring and the insertion hole has a shape which is slightly larger than the diameter of the roller at its inlet and which gradually flares out toward the space between the inner and outer rings. In this structure, the outer ring can be made thinner without impairing its strength and structural integrity and the bearing assembly can be made smaller in size. However, in this structure, since a gap is defined between a plug inserted into the insertion hole after feeding a required number of rollers into the space between the outer and inner rings and the outer ring because of the flared out shape of the insertion hole, the guide surface of the outer ring along which the rollers roll is not smooth so that the rollers tend to strike against the tip end of the plug when they roll. In addition, since the insertion hole has a flared-out structure, difficulty is encountered in manufacture.

SUMMARY OF THE INVENTION

In accordance with the present invention, there is provided a crossed roller bearing assembly which includes a pair of outer and inner rings between which a roller space is defined and a plurality of rollers which are disposed in the roller space to thereby allow one of the outer and inner rings to rotate relative to the other. Either one of the outer and inner rings is provided with an insertion hole for feeding a required number of rollers to be fed into the space between the inner and outer rings. The assembly also includes a plug for plugging the insertion hole after feeding the required number of rollers into the roller space and the plug has an outer shape which substantially corresponds to the shape of the insertion hole. In the preferred embodiment, the insertion hole is generally cylindrical in shape and the plug is also generally cylindrical in shape so that when the plug is fit into the insertion hole, the plug is snugly fit into the insertion hole, thereby defining no gap between that of the inner and outer rings in which the insertion hole is provided and the plug. In the preferred embodiment, the plug has a length slightly shorter than the length of the insertion hole so that when the plug is fit in position, the tip end of the plug is located slightly short of the inner or outer peripheral surface of the outer or inner ring, respectively, depending on whether the insertion hole is provided in the outer ring or inner ring.

It is therefore a primary object of the present invention to obviate the disadvantages of the prior art as described above and to provide an improved roller bearing assembly.

Another object of the present invention is to provide an improved crossed roller bearing assembly including a plurality of rollers which are disposed in an alternate crossed arrangement.

A further object of the present invention is to provide an improved crossed roller bearing assembly smooth in operation and low in rolling resistance.

A still further object of the present invention is to provide an improved crossed roller bearing assembly compact in size and low at cost.

Other objects, advantages and novel features of the present invention will become apparent from the following detailed description of the invention when considered in conjunction with the accompanying drawings.

DESCRIPTION OF THE PREFERRED EMBODIMENTS

In accordance with the present invention, there is provided a crossed roller bearing assembly including a pair of outer and inner rings and a plurality of rollers disposed in a space between the inner and outer rings in rolling contact therewith to thereby allow one of the inner and outer rings to rotate relative to the other. The rollers are arranged in an alternate crossed relationship, so that any adjacent two of the rollers have their rotating axes directed perpendicular to each other. Each of the rollers has a diameter which is substantially equal to its height. An insertion hole having a predetermined cross sectional shape is provided in either of the inner and outer rings so that the rollers can be fit into the space between the inner and outer rings after the inner and outer rings are assembled. A plug having a predetermined outer shape corresponding to the shape of the insertion hole can be snugly fit into the insertion hole after insertion of the rollers.

In the preferred embodiment, the insertion hole is cylindrical in shape and the plug has a corresponding shape so that there is no gap defined between the insertion hole and the plug when the plug is fit into the insertion hole. The insertion hole has a diameter which ranges between the diameter of the roller and the diagonal length in cross section of the roller. Since a V- shaped guide groove is provided in each of the inner and outer surfaces of the outer and inner rings, respectively, a guide roller space annular and generally square in cross section is defined and the rollers are fit into the roller guide space one after another through the insertion hole. In this case, since the insertion hole has a diameter which is larger than the diameter of the rollers but smaller than the diagonal length in cross section of the rollers, the rollers can be properly and smoothly fit into the roller guide space defined between the inner and outer rings. The plug is fit into the insertion hole after insertion of the required number of rollers to thereby plug the insertion hole. In the preferred embodiment, the plug is slightly shorter in length than the insertion hole so that the bottom end surface of the plug is slightly recessed, preferably in the order of 1 mm or less, as compared with the guide surface defined by either one of the inner and outer rings.

In the preferred embodiment, the insertion hole has a diameter which ranges between 1.15 and 1.41 times the diameter of the rollers. The plug has an outer shape which corresponds to the shape of the insertion hole so that no gap is present between the insertion hole and the plug when the plug is fit into the insertion hole. And, preferably, use is made of a pin to have the plug fixed in position after insertion into the insertion hole.

Figure 1:
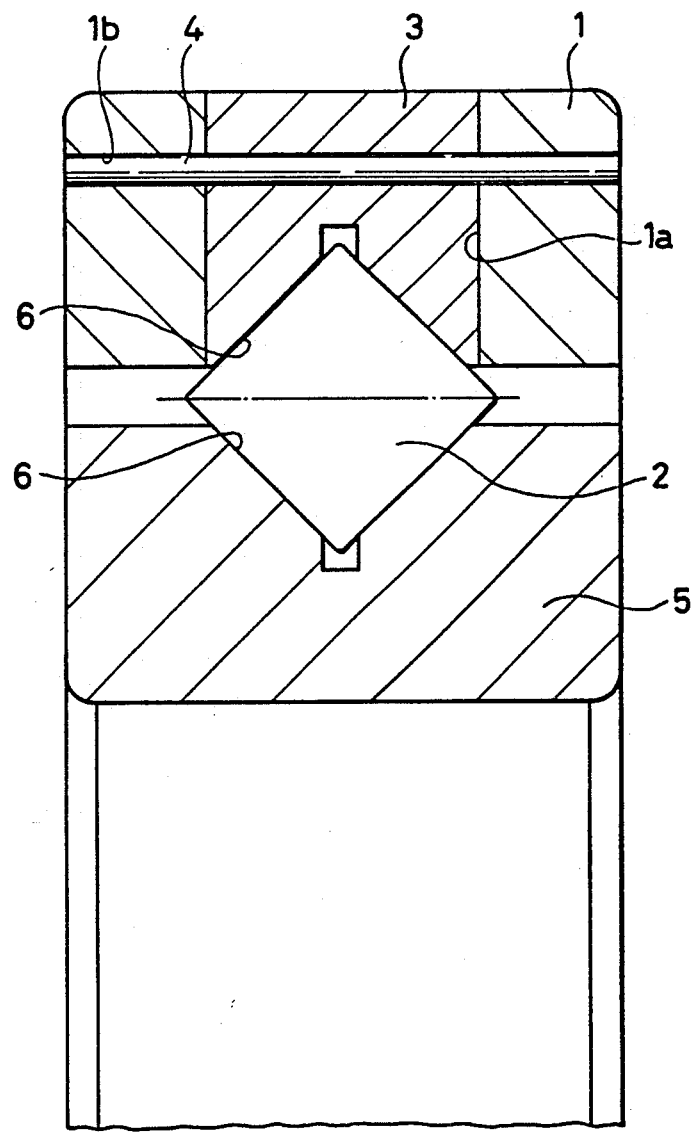
FIG. 1 is a longitudinal cross section showing a part of a crossed roller bearing assembly constructed in accordance with one embodiment of the present invention.

Referring now to FIG. 1, there is schematically shown in cross section a crossed roller bearing assembly constructed in accordance with one embodiment of the present invention. As shown, the present crossed roller bearing assembly includes an outer ring 1 and an inner ring 5 and a plurality of cylindrical rollers 2 disposed between the outer and inner rings 1 and 5 to provide a rolling contact between the outer and inner rings 1 and 5 via the rollers 2. The outer ring 1 is provided with an outer V-shaped guide groove 6 at its inner peripheral surface and similarly an inner V-shaped guide groove 6 is formed at the outer peripheral surface of the inner ring 5. These V-shaped guide grooves 6 and 6 are located opposite to each other when assembled to thereby define a roller guide space which is annular and generally square in cross section between the outer and inner rings 1 and 5. The outer ring 1 is also provided with an insertion hole 1a for allowing the rollers 2, which are preferably identical in shape and size and whose diameters are substantially equal to their heights, to be fit into the roller guide space between the outer and inner rings 1 and 5 therethrough.

Figure 2:
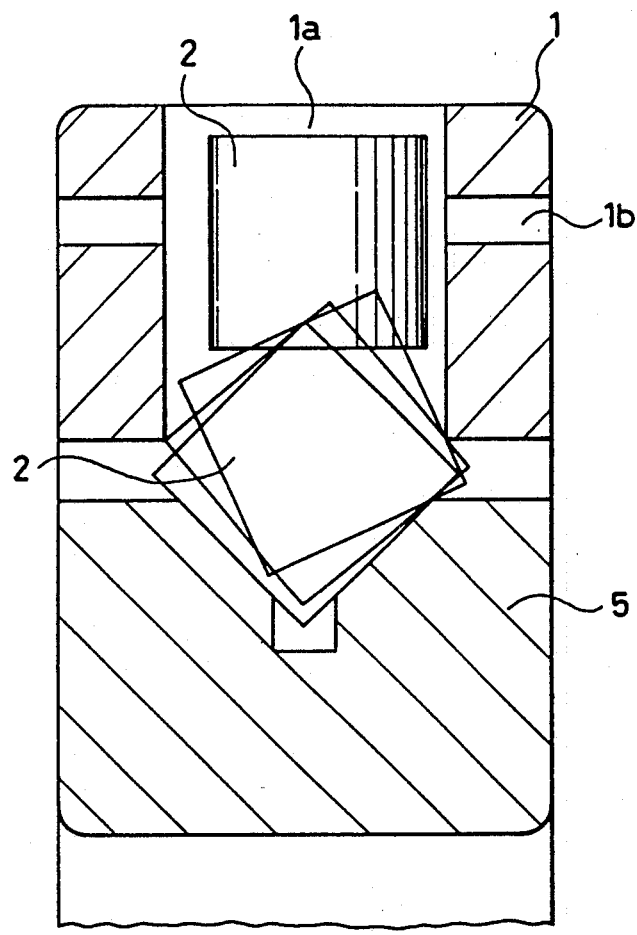
FIG. 2 is a longitudinal cross section showing the same structure as that of FIG. 1 excepting the fact that the plug 3 and the pin 4 are removed to show how a roller 2 is fit into a run space between the inner and outer rings.

In the illustrated embodiment, the insertion hole 1a has a diameter which can be set in a range between the diameter of the roller 2 and the diagonal length in cross section of the roller 2. In general, the diameter of the insertion hole 1a is set to be as small as practically possible, but it must be larger than the diameter of the roller 2 so as to allow the roller 2 to be fit into the guide space between the outer and inner rings 1 and 5 therethrough. The rollers 2 are fed into the guide space through the insertion hole 1a one after another such that any two adjacent rollers 2 when arranged in the guide space are in a crossed arrangement as shown in FIG. 2. After insertion of the required number of the rollers 2, the plug 3 is fit into the insertion hole and fixed in position by passing a fixture pin 4 through a hole 1b of the outer ring 1 and a corresponding hole in the plug 3. It is to be noted that since the diameter of the insertion hole 1a is set between the diameter of the rollers 2 and the diagonal length in cross section of the rollers 2, each of the rollers 2 can be fed into the guide space with a proper orientation so that all of the rollers 2 can be properly fed into the guide space quite easily.

Figure 3:
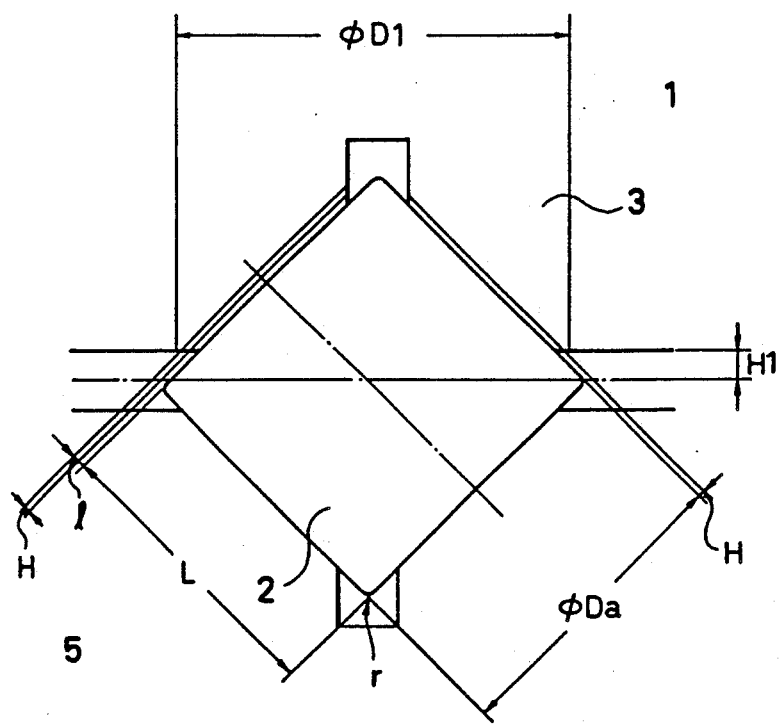
FIG. 3 is a schematic illustration showing on an enlarged scale a relationship between the roller 2 and the inner and outer rings.

Referring now to FIG. 3, the roller 2 has a diameter Da and a height L and the insertion hole 3 has a diameter Dl. In the illustrated embodiment, the diameter Dl of the insertion hole must be larger than the diameter Da of the roller 2 so as to allow the roller 2 to be fed into the roller guide space defined between the outer and inner rings 1 and 5. The diameter Dl of the insertion hole 3 must be smaller than the diagonal length in cross section of the roller 2 so as to prevent the roller 2 from changing its orientation while it moves through the insertion hole 1a. The diameter Dl of the insertion hole 3 should be set larger so as to allow to feed rollers 2 into the roller guide space easily; whereas, the diameter Dl of the insertion hole 3 should be set as small as practically possible so as to minimize the rolling resistance of the rollers 2 in operation.

Regarding a relationship between the height L of the roller 2 and a gap l between an end surface the height L of the roller 2 is preferably set slightly smaller than the diameter Da of the roller so as to prevent a load from being applied to the end surface of the roller 2 as much as possible. If the height L of the roller 2 is set shorter, a load is prevented from being applied to an end surface of the roller 2; however, if the height L is set excessively smaller, a load bearing capacity of the roller 2 is reduced correspondingly. Thus, the height L should not be set too small. The edge defined between an end surface and the peripheral surface of the roller 2 is chamfered with a radius of curvature r. If the radius of curvature r is set excessively large, the load bearing capacity of the roller 2 is reduced significantly. Thus, the radius of curvature r should not be set too large. A gap Hl is defined between the pitch circle diameter of the roller 2 and the inner or outer surface of the outer or inner ring 1 or 5, respectively. If the gap Hl is set larger, the rollers 2 may be fed into the guide space more easily, but the load bearing capacity of the roller 2 is reduced. Preferably, if the diameter Da of the roller 2 is 5 mm, the gap Hl should be set in the order of 0.35 mm.

As described above, the diameter Dl of the insertion hole 1a should be properly determined in consideration of various factors. The height L and the radius of curvature r of the roller 2 are prescribed in the Japanese Industrial Standards, JIS B1506. For the rollers which satisfy the JIS requirements, it has been found that the following relationship holds.

$$Dl = A \times Da = B \times SQRT(2) \times Da$$

where, A is a value ranging between 1.15 and 1.41 and B is a value ranging between 0.81 and 1.0. In the case where use is made of rollers 2 having r larger than those of the JIS standards, e.g., $r = 2 \times Hl - (Da - L)$, if Hl is made larger, the load bearing capability of the bearing assembly decreases more. Thus, in practice, if Dl is determined following the above equation, the diameter Dl of the plug 3 can be made smaller while preventing a reduction in the load bearing capacity and a reduction in the strength of the outer ring 1.

In accordance with another important feature of the present invention, the plug 3 is so structured that its bottom end surface is located slightly short of the outer V-shaped guide surface of the outer ring 1. Thus, a recess is defined at the bottom end surface of the plug 3 when the plug 3 is set in position. Such a structure is advantageous because the bottom end portion of the plug 3 is prevented from sticking out into the roller guide space defined between the outer and inner rings 1 and 5 so that the rollers 2 may roll along the guide space smoothly without irregularities. In this structure, the rollers 2 are generally prevented from coming into contact with the bottom end surface of the plug 3 and thus the rollers 2 may roll along the guide space smoothly without an increase in rolling resistance. The amount of this recess at the bottom end surface of the plug 3 is preferably set in a range between a few microns and a few tens of microns (60 microns at maximum) for the cylindrical rollers which satisfy the JIS requirements. In general, this recess may be set approximately in the order of 0.1 mm, if desired.

Figure 4:
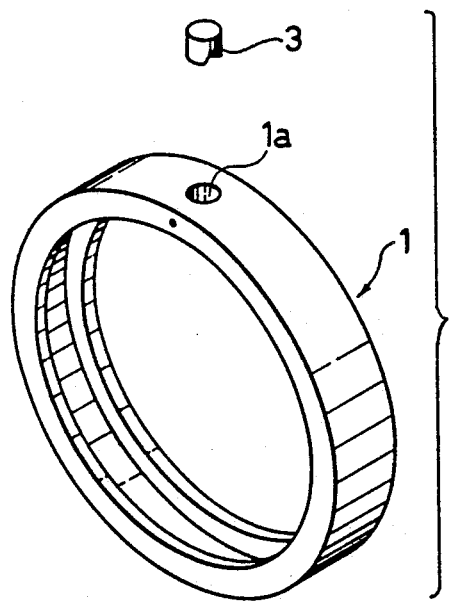
FIG. 4 is an exploded, perspective view showing the outer ring 1 and the plug 3 of the present crossed roller bearing assembly.
Figure 5:
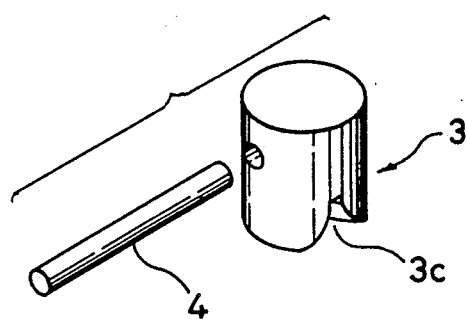
FIG. 5 is an exploded, perspective view showing a relationship between the plug 3 and the pin 4 of the present crossed roller bearing assembly.

FIGS. 4 and 5 illustrate how the plug 3 is fit into the insertion hole 1a of the outer ring 1 and how the plug 3 is fixed in position by the pin 4. In the present embodiment, the outer V-shaped guide groove of the outer ring 1 can be processed or machined with the plug 3 set in position in the insertion hole 1a particularly for the finishing purpose. If desired, however, the outer ring 1 and the plug 3 may be processed or machined separately. With the plug 3 set in position in the insertion hole 1a, the pin 4 is fit into the hole 1b of the outer ring 1 and the horizontal hole of the plug 3 so that the plug 3 may be fixed in position in the insertion hole 1a. When the plug 3 is set in position, its bottom end surface 3c, which is V-shaped commensurate with the V-shaped guide groove 6 of the outer ring 1, is located slightly outside of the V-shaped guide groove 6 of the outer ring 1 as described previously.

Figure 6:
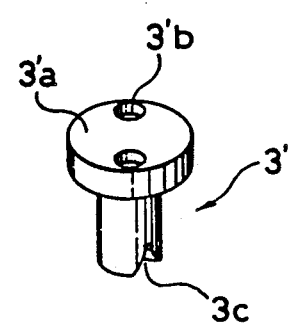
FIG. 6 is a perspective view showing a plug constructed in accordance with another embodiment of the present invention.

FIG. 6 illustrates a plug 3' constructed in accordance with another embodiment of the present invention. The plug 3' includes a mounting flange 3'a at the top end and the mounting flange 3'a is used to have the plug 3' fixedly attached to the outer ring 3. For this purpose, a pair of mounting holes 3'b is formed in the mounting flange 3'a of the plug 3' and bolts extend through the mounting holes 3'b to have the plug 3' fixedly attached to the outer ring 1.

As described above, the present invention has various features. It should, however, be noted that any fixing means may be used for fixing a plug to the outer ring 1 other than those described above. In the embodiment described above, the insertion hole 1a is provided in the outer ring 1. However, such an insertion hole 1a may also be provided in the inner ring 5 in addition to or in place of the insertion hole 1a of the outer ring 1. It should also be noted that the present invention is applicable to any type of crossed roller bearing assembly and it should not be limited to those which satisfy the JIS requirements. In accordance with the present invention, the rolling resistance is not increased even if the plug is snugly fit in position in the insertion hole. In addition, since the diameter of the plug may be minimized, the structural integrity of the bearing assembly is not impaired. Besides, the thickness of the outer and inner rings may be minimized so that there can be provided a crossed roller bearing assembly extremely compact in size. Furthermore, the present bearing assembly is extremely easy to manufacture and assemble so that it is very low at cost.

While the above provides a full and complete disclosure of the preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A crossed roller bearing assembly comprising:
   an outer ring having an outer guide groove;
   an inner ring having an inner guide groove, said inner ring being located inside of said outer ring with said inner guide groove located opposite to said outer guide groove to thereby define a guide space;
   a plurality of rollers arranged in said guide space such that any two adjacent ones of said plurality of rollers are directed perpendicular to each other;
   an insertion hole formed in at least one of said outer and inner rings and extending radially therethrough;
   a plug for plugging said insertion hole when fit into said insertion hole, said plug having a shape substantially corresponding to that of said insertion hole so that no gap is defined between said plug and said insertion hole when said plug is set in position inside of said insertion hole; and
   wherein said insertion hole is circular in cross sectional shape and has a diameter which is larger than a diameter of said rollers but smaller than a diagonal length in cross section of said rollers.

2. The assembly of claim 1, wherein said plug is cylindrical in shape and having a V-shaped bottom end surface which is located slightly outside of said guide space defined by said inner and outer V-shaped guide grooves when said plug is set in position.

3. The assembly of claim 1, wherein the diameter of said insertion hole is set in a range between 1.15 and 1.41 times the diameter of said rollers.

4. A crossed roller bearing assembly comprising:
   an outer ring having an outer guide groove;
   an inner ring having an inner guide groove, said inner ring being located inside of said outer ring with said inner guide groove located opposite to said outer guide groove to thereby define a guide space;
   a plurality of rollers arranged in said guide space such that any two adjacent ones of said plurality of rollers are directed perpendicular to each other;
   an insertion hole formed in at least one of said outer and inner rings and extending radially therethrough;
   a plug for plugging said insertion hole when fit into said insertion hole, said plug having a shape substantially corresponding to that of said insertion hole so that no gap is defined between said plug and said insertion hole when said plug is set in position inside of said insertion hole;
   further comprising means for fixing said plug in position in said insertion hole; and
   wherein said fixing means includes a flange formed at top end of said plug and formed with at least one through-hole and a bolt which extends through said through-hole.

* * * * *